(12) United States Patent
Uemura et al.

(10) Patent No.: US 6,293,339 B1
(45) Date of Patent: Sep. 25, 2001

(54) VEHICLE AIR-CONDITIONING SYSTEM WITH INDEPENDENT LEFT/RIGHT TEMPERATURE CONTROL DURING MAXIMUM COOLING

(75) Inventors: Yukio Uemura; Takuya Natsume; Kazushi Shikata, all of Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/257,077

(22) Filed: Feb. 24, 1999

(30) Foreign Application Priority Data

Mar. 11, 1998 (JP) .................................................. 10-060188

(51) Int. Cl.[7] .............................. F25B 29/00; B60H 1/00
(52) U.S. Cl. .............................. 165/203; 165/42; 165/43; 165/103; 165/204; 236/49.3; 236/91 C; 454/75; 454/156; 454/126; 454/121; 251/901
(58) Field of Search .................. 165/42, 43, 203, 165/103, 204; 454/121, 126, 156, 161, 75; 236/49.3, 91 C; 251/901

(56) References Cited

U.S. PATENT DOCUMENTS

| 4,456,166 | * | 6/1984 | Kagohata ................ 165/43 |
| 4,523,715 | * | 6/1985 | Ohsawa et al. ........... 165/43 |
| 4,697,734 | * | 10/1987 | Ueda .................... 236/13 |
| 4,759,269 | | 7/1988 | Brown et al. ........... 165/42 |
| 4,762,169 | * | 8/1988 | Anderson et al. ........ 165/43 |
| 4,829,884 | * | 5/1989 | Kagohata ............... 165/43 |
| 4,842,047 | * | 6/1989 | Sakurada et al. ........ 236/13 |
| 4,858,676 | * | 8/1989 | Bolfik et al. .......... 165/42 |
| 4,938,033 | * | 7/1990 | Ogihara et al. ......... 165/43 |
| 5,086,830 | * | 2/1992 | Heinle et al. .......... 165/43 |
| 5,326,315 | * | 7/1994 | Inoue et al. ........... 454/126 |
| 5,361,984 | * | 11/1994 | Annerstedt et al. ..... 165/42 |

FOREIGN PATENT DOCUMENTS

A-7-251623    10/1995   (JP) .

* cited by examiner

Primary Examiner—John K. Ford
(74) Attorney, Agent, or Firm—Harness, Dickey & Pierce, PLC

(57) ABSTRACT

A vehicle air-conditioning system that independently controls left-right air flow distribution in correspondence with left and right heat loads during a maximum cooling mode. In the system, blowout air flow is increased when driver seat side and passenger seat side air-mixing film members are both positioned in a maximum cooling position, and the heat load has risen in only one of a driver seat side space and a passenger seat side space in a passenger compartment. Further, each respective film member is operated to fully open a cool air bypass passage on the side on which the heat load has risen and the respective film member corresponding to the side on which the heat load has not risen significantly is operated to reduce the open area of the cool air bypass passage. At the same time, fan speed is increased to increase the air blow amount.

27 Claims, 15 Drawing Sheets

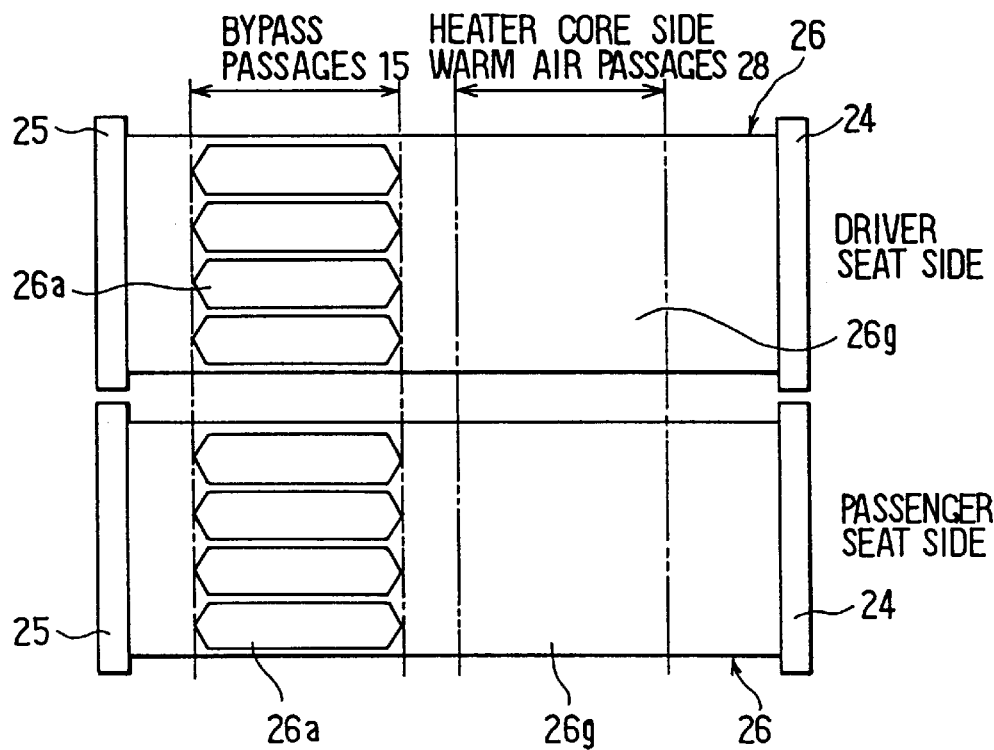
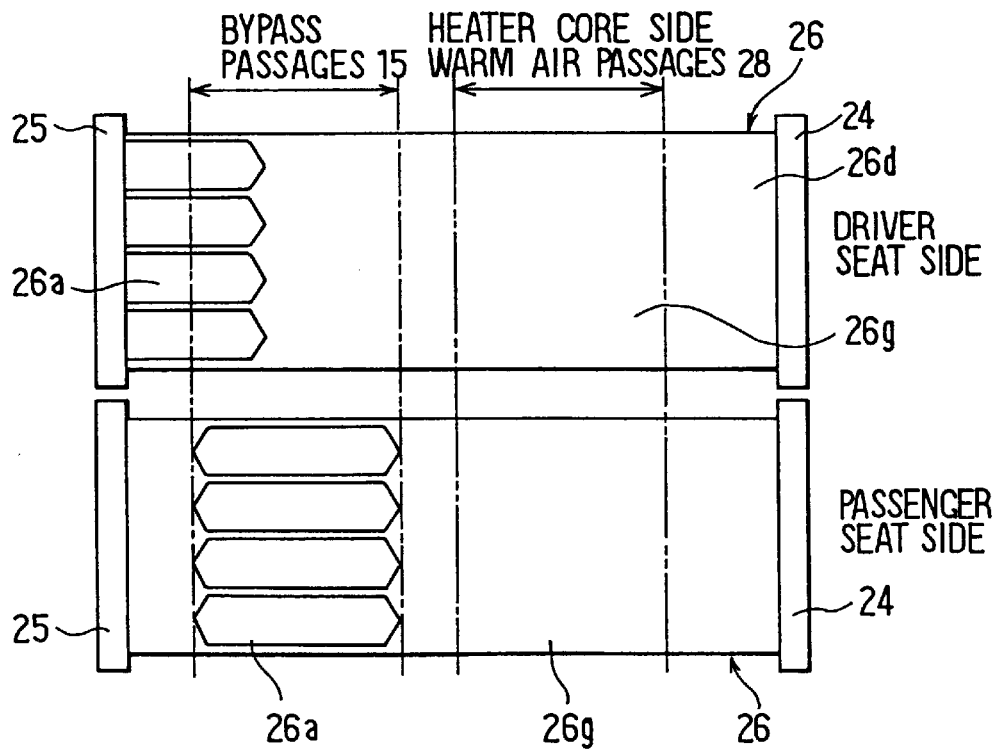

VEHICLE AIR-CONDITIONING SYSTEM WITH INDEPENDENT LEFT/RIGHT TEMPERATURE CONTROL DURING MAXIMUM COOLING

CROSS-REFERENCE TO RELATED APPLICATION

The present invention is related to, and claims priority from, Japanese Patent Application Hei. 10-60188.

BACKGROUND OF THE INVENTION

1. Field of the Invention

This invention relates to a vehicle air-conditioning system capable of independently controlling left and right outlet air temperatures by adjusting flow proportions of warm and cool air flows, and particularly to a system capable of independently controlling the cooling of both left and right side occupants at times of maximum cooling by controlling a left-right air flow distribution.

2. Description of the Related Art

In conventional air-mixing type vehicle air-conditioning systems, an air-mixing door is operated at times of maximum cooling to a position in which it fully opens a cool air bypass passage and fully closes an air inflow path to a heat exchanger for heating. When there is an unbalanced incidence of solar radiation on a vehicle, such as when a passenger seat side (left side), is exposed to solar radiation while a driver seat side (right side) is not, a temperature difference due to the radiation arises between the two sides. Consequently, the amount of cooling necessary to achieve a comfortable temperature on the left side varies greatly with respect to the amount of cooling for the right side.

However, in a vehicle air-conditioning system of the kind mentioned above, the left and right side outlet temperatures cannot be varied by changing the operating position of the air-mixing door when the air-mixing door has already been operated to its maximum cooling position.

In Japanese Laid-Open Patent Application No. Hei. 7-251623, the positions of left and right film type air-mixing doors can be adjusted while preventing air from passing to a heater core at times of maximum cooling in a vehicle air-conditioning system using film type air-mixing doors. As a result, it is possible to adjust left and right film-type air mixing doors to selectively direct conditioned air into left and right heater core bypass passages, respectively. Therefore, even when air is delivered into left and right ventilation paths with a single, common blower it is possible for left and right cool air flows to be varied independently.

Even though there is no specific description of a relationship between blower flow and position control of the left and right film type air-mixing doors at times of maximum cooling, certain cooling limitations are present in the above-described system. For example, when blower speed is increased to increase cool air flow on the vehicle passenger side heated by a large amount of solar radiation on, for example, a hot summer day, cool air flow also increases on the driver side not heated to the same extent as the passenger side. As a result, the driver side is excessively cooled.

SUMMARY OF THE INVENTION

It is therefore an object of the present invention, in view of the above-mentioned limitations, to provide a left-right independent temperature control type vehicle air-conditioning system which at times of maximum cooling can control left-right air flow distribution corresponding to vehicle left and right side heat loads.

To achieve this and other objects, according to the present invention, when the heat load rises on only one side of a vehicle passenger compartment, air flow delivered thereto by a blower is increased when temperature adjusting devices of both sides are both in a maximum cooling state. At the same time, air flow to the side on which the heat load has not risen is reduced.

As a result, cool air flow can be increased on the side having the increased heat load by increasing the delivery flow of the blower, while the amount of cool air blown out to the side exhibiting little or no temperature increase can be prevented from excessively increasing through reduction of the open area of the respective ventilation path.

Therefore, even when the heat loads of the left and right sides of the vehicle are different due to unbalanced solar radiation or the like at a time of maximum cooling, the left-right flow distribution can be controlled in correspondence with the left and right heat loads, and both left and right side occupants can be satisfactorily cooled.

BRIEF DESCRIPTION OF THE DRAWINGS

FIG. 8 is a plan view of left and right air-mixing film members of the first preferred embodiment;

FIG. 9 is a plan view of left and right air-mixing film members of the first preferred embodiment;

DETAILED DESCRIPTION OF THE PREFERRED EMBODIMENTS

Preferred embodiments of the invention will now be described with reference to the accompanying drawings.

(First Preferred Embodiment)

Figure 1:
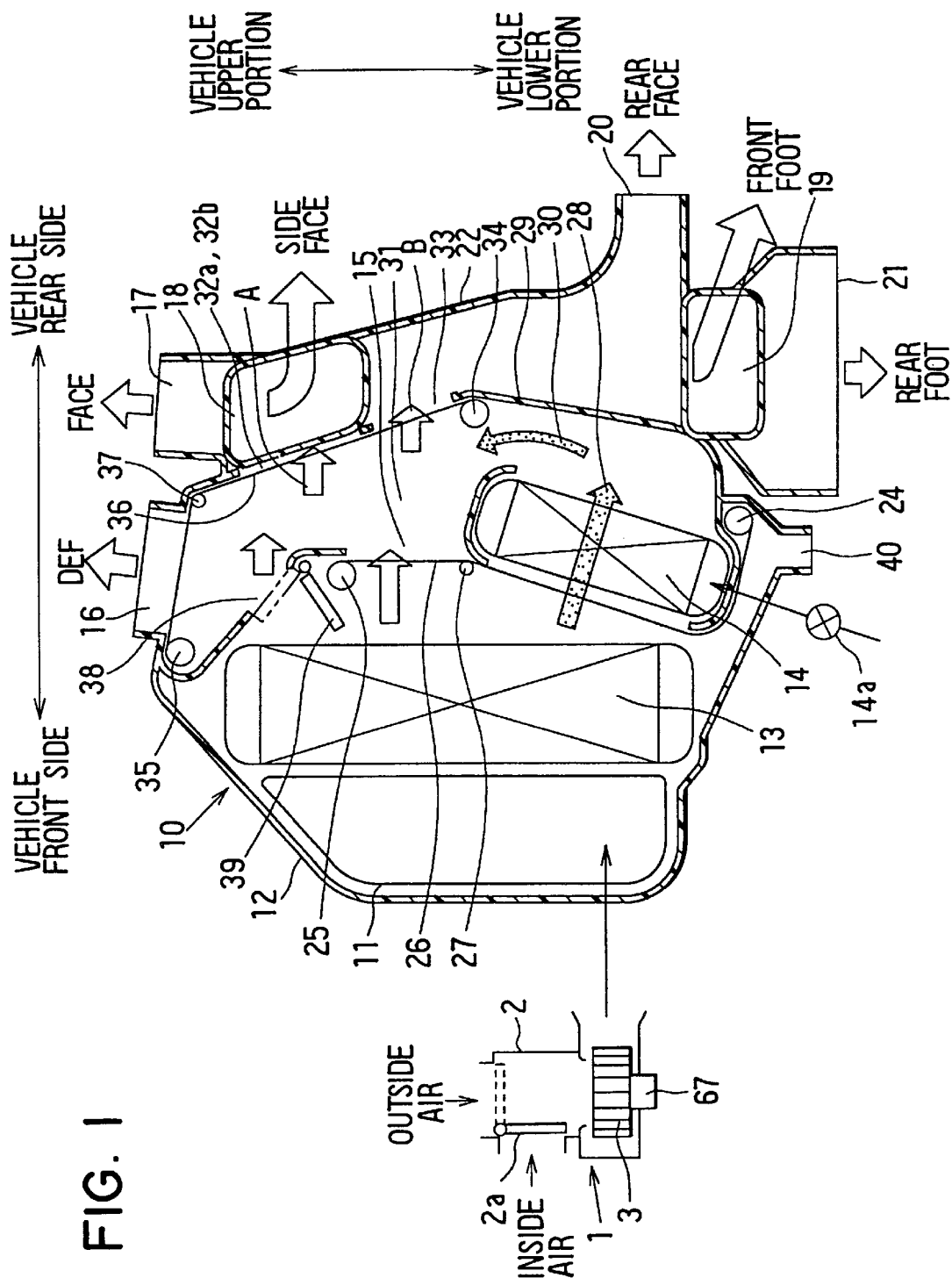
FIG. 1 is a schematic sectional side view of an air-conditioning unit in a first preferred embodiment of the invention.

FIG. 1 shows an air-conditioning unit of a vehicle air-conditioning system to which the invention has been applied. The ventilation circuit of the vehicle air-conditioning system is mainly made up of two parts, a blower unit 1 and an air-conditioning unit 10. The air-conditioning unit 10 is of a central installation layout type, and is typically disposed below the vehicle left-right direction center of a dash board in the front of the vehicle passenger compartment. The blower unit 1 is offset at the side of the air-conditioning unit 10, and is oriented opposite a front passenger seat.

The blower unit 1 has in an upper side thereof an ordinary inside/outside air switching box 2 for switchably introducing outside air and inside air, and an inside/outside switching door 2a is mounted in the inside/outside air switching box 2. A centrifugal blower 3 is disposed below the inside/outside air switching box 2, to blow air into an air inlet 11 at the front end of the air-conditioning unit 10.

The air-conditioning unit 10 has an air-conditioner case 12 made of a durable material such as resin, and includes a plurality of split-molded component parts integrally joined together by suitable fasteners such as clamps. An evaporator 13 and a heater core 14 are disposed in series inside the air-conditioner case 12. The evaporator 13 preferably is a conventional refrigerating circuit including a compressor, a condenser and a pressure-reducing device (not shown), and is a cooling heat exchanger for cooling air passing through the air-conditioner case 12. The heater core 14 is disposed downstream from the evaporator, and is a heating heat exchanger. Warm water (engine cooling water) flows into the heater core through a warm water valve 14a, disposed on the inlet side of a warm water circuit, to heat the air passing through the case.

The evaporator 13 extends across the ventilation path inside the air-conditioner case 12, while the heater core 14 extends only across a lower part of the ventilation path inside the air-conditioner case 12. A cool air bypass passage 15 for bypassing the heater core 14 is formed above the heater core 14.

A plurality of outlet ports 16–21 are formed at a downstream end of the air-conditioner case 12, and outlet ducts (not shown) for delivering conditioned air to predetermined places inside the passenger compartment are connected to the downstream sides of these outlet ports.

The outlet ports include a defroster outlet port 16 provided at an upper front portion of the air-conditioner case 12 and connected by way of a defroster duct (not shown) with a defroster outlet (not shown) for blowing conditioned air toward the inner side of a front windshield in the passenger compartment. Also, a foot and face blowout air branching duct 22 is integrally connected to a portion of the air-conditioner case 12.

This blowout air branching duct 22 has a face outlet port 17 and side face outlet ports 18 at an upper side thereof. The face outlet port 17 is centrally disposed in a direction perpendicular to the paper of FIG. 1 (in the left-right direction of the vehicle), and the side face outlet ports 18 are offset to the left and right sides of the face outlet port 17. The face outlet port 17 connects by way of a face duct (not shown) with a center face outlet for blowing conditioned air toward the central upper body of a front seat occupant.

The side face outlet ports 18 connect by way of side face ducts (not shown) with side face outlets for blowing conditioned air toward a front seat side window or the upper left and right sides a vehicle front seat. A rear seat face outlet port 20 is provided in a lower side of the blowout air branching duct 22, and is connected by way of a rear seat face duct (not shown) with a rear seat face outlet (not shown) for blowing conditioned air toward an upper rear seat area.

Also, front seat foot outlet ports 19 are disposed on left and right sides of the bottom of the blowout air branching duct 22, and connect by way of foot ducts (not shown) with a driver seat foot outlet (not shown) for blowing conditioned air toward a lower driver seat area and a passenger seat foot outlet (not shown) for blowing conditioned air toward a lower a passenger seat area.

Further, a rear seat foot outlet port 21 connects by way of a rear seat foot duct (not shown) with a rear seat foot outlet (not shown) for blowing conditioned air to a lower rear seat area.

Inside the air-conditioner case 12, a first driving shaft 24 and a first following shaft 25 are rotatably mounted with respect to the air-conditioner case 12. Respective ends of an air-mixing film member 26 are fixed to and wound around the first driving shaft 24 and the first following shaft 25. The air-mixing film member 26 is made of a flexible material having excellent flexibility and strength, such as a resin film material like polyethylene resin.

The air-mixing film member 26 passes around the first driving shaft 24, a side face of the heater core 14, an intermediate roller 27 and the first following shaft 25 so that it extends across a warm air passage 28 passing through the heater core 14 and the bypass passage 15 bypassing the heater core 14, and is slideable in the air-conditioner case 12 while being kept under a fixed tension.

The first driving shaft 24 is driven by a driving device such as a step motor, and rotation of the first driving shaft 24 is also transmitted by a conventional rotation transmitting mechanism (not shown) to the first following shaft 25.

A plurality of openings 26a (see FIG. 4) are formed in the air-mixing film member 26 and can be stopped in any position to adjust the amount of air passing through the passages 15, 28 when the first driving shaft 24 is rotated by the driving device.

A wall 29, rising diagonally upwardly from below the downstream side of the heater core 14, forms a warm air passage 30 leading upwardly from the downstream side of the heater core 14. An air-mixing chamber 31 for mixing cool air that has passed through the bypass passage 15 and warm air that has passed through the warm air passages 28, 30 is formed above the heater core 14 in the air-conditioner case 12. Cool air is mixed with warm air in the air-mixing chamber 31 to create conditioned air having a predetermined temperature.

Face openings 32a, 32b are formed in an upper portion of a wall 29 located on the downstream side of the heater core 14, and a foot opening 33 is formed at a lower portion of the wall. More particularly, a center face opening 32a is centrally positioned in a direction perpendicular to the paper of FIG. 1 (in the left-right direction of the vehicle) and connects with the face outlet port 17 and the rear seat face outlet port 20. Also, side face openings 32b are positioned on the left and right sides of the center face opening 32a and connect with the side face outlet ports 18.

The foot opening 33 connects with the front seat foot outlet port 19 and the rear seat foot outlet port 21, and the openings 32a, 32b and 33 are separated from each other by partitioning (not shown). As a result, conditioned air indicated by the arrow A in FIG. 1 passes through the face openings 32a, 32b and flows into the face outlet ports 17, 18, 20, and conditioned air indicated by the arrow B flows through the foot opening 33 into the foot outlet ports 19, 21.

A second driving shaft 34 and a second following shaft 35 are also rotatably mounted within the air-conditioner case 12. Respective ends of a ventilation mode switching film member 36 are fixed to and wound around the second driving shaft 34 and the second following shaft 35. The ventilation mode switching film member 36, like the air-mixing film member 26, is also made of a durable resin film material having good flexibility.

An intermediate guide shaft 37 is disposed between the second driving shaft 34 and the second following shaft 35, and causes the ventilation mode switching film member 36 to follow the inner wall of the air-conditioner case 12. Although the intermediate guide shaft 37 and the aforementioned intermediate roller 27 may be rotatable to facilitate smooth movement of the ventilation mode switching film members 36, 26, alternatively the shaft and roller may be integrally molded with the resin air-conditioner case 12 in a non-rotatable manner.

The ventilation mode switching film member 36 passes around the second driving shaft 34, the intermediate guide shaft 37 and the second following shaft 35 so that it faces the upstream side of the wall in which the openings 16, 32a, 33 are formed, and is movable along the wall under a fixed tension.

The second driving shaft 34 is driven by an independent driving device such as a step motor, and rotation of the second driving shaft 34 is transmitted to the second following shaft 35 by way of a rotation transmitting mechanism (not shown).

A plurality of openings (not shown) are formed in the ventilation mode switching film member 36, and these openings can be stopped in any position to open and close the openings 16, 32a and 33 to switch the ventilation mode when the second driving shaft 34 is rotated by the driving device.

The side face openings 32b connect with the air-mixing chamber 31 at all times, irrespective of the operating position of the film member 36, to enable conditioned air from the air-mixing chamber 31 to pass in all ventilation modes.

A cool air bypass opening 38 is provided in the air-conditioner case 12 in an upper side position immediately after the evaporator 13, and is opened and closed by a pivoting plate-like cool air bypass door 39. A drain outlet 40 to drain away water forming on the evaporator 13 is formed below the heater core 14 on the bottom face of the air-conditioner case 12.

Figure 2:
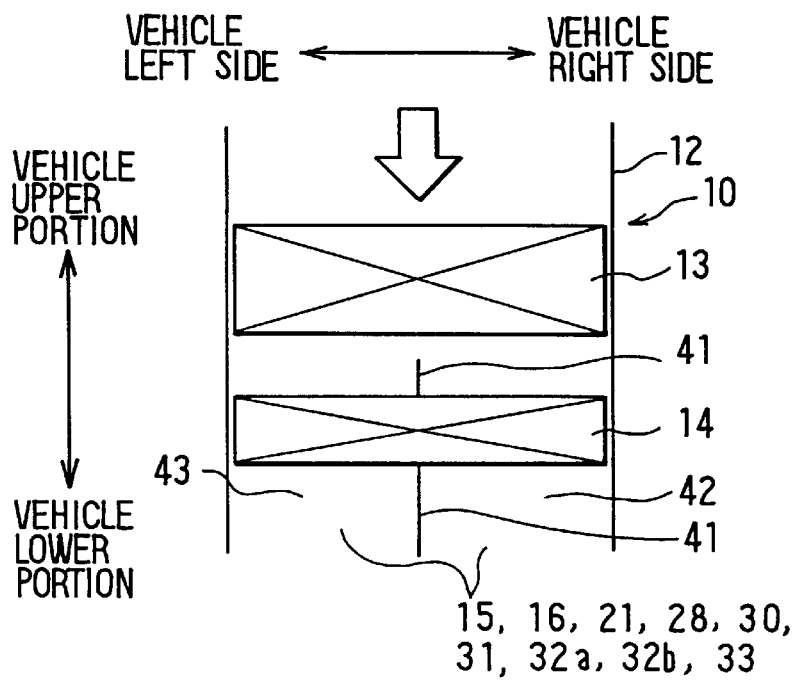
FIG. 2 is a schematic sectional plan view of a main part of FIG. 1.

To make the air-conditioning unit 10 described above of a left-right independent temperature control type, a partition plate 41 is provided in the vehicle left-right direction center of the inside of the air-conditioning unit 10 as shown in FIG. 2. The partition plate 41 extends from a position on the upstream side of the heater core 14 (specifically, a position on the upstream side of the air-mixing film member 26 and the cool air bypass door 39) to the various ports 16–21, and partitions the ventilation path inside the air-conditioning unit 10 into two ventilation paths —a vehicle right side ventilation path 42 and a vehicle left side ventilation path 43.

The cool air bypass passage 15, the ports 16–21, the warm air passages 28, 30, the air-mixing chamber 31, the cool air bypass opening 38 and the openings 32a, 32b, 33 are provided independently for each of the left and right ventilation paths 42, 43, and the film members 26, 36 and the cool air bypass door 39 also operated independently for each of the left and right ventilation paths 42, 43. Conditioned air from a single, common centrifugal blower 3 of the blower unit 1 is blown into the left and right ventilation paths 42, 43. In FIG. 2, because the purpose of this figure is to schematically illustrate the disposition of the partition plate 41, components such as the door have been omitted.

Figure 3:
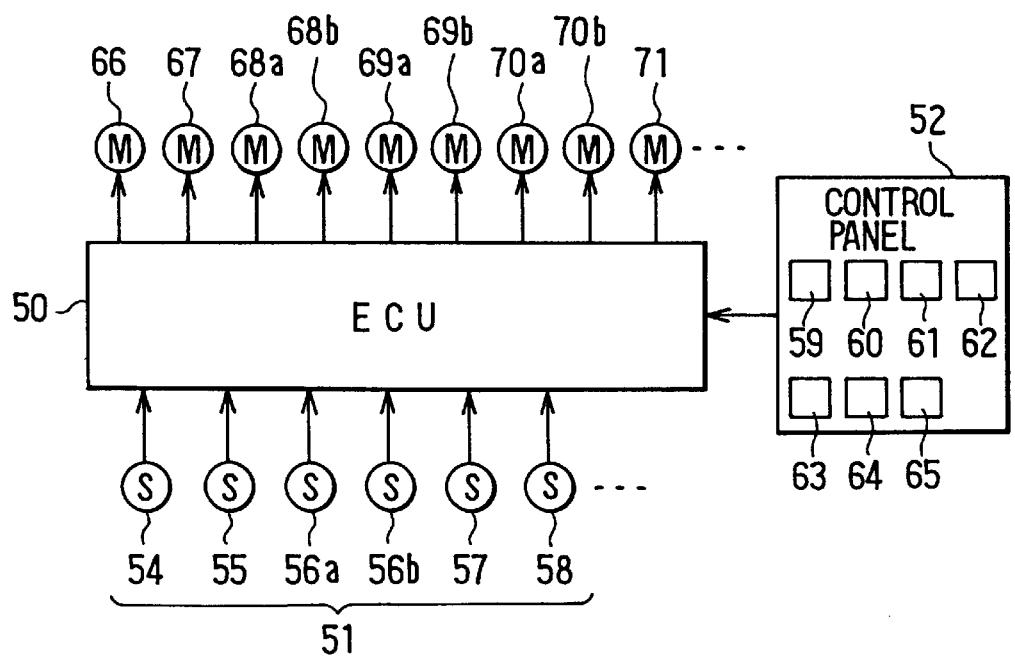
FIG. 3 is a block diagram of electronic control in the first preferred embodiment.

FIG. 3 is an electronic control block diagram of the present preferred embodiment. An electronic control unit (ECU) 50 includes a microcomputer and other well-known components, and controls various air-conditioning devices in accordance with a preset program. When a vehicle ignition switch (not shown) is switched on, the ECU 50 is supplied with power from a car battery (not shown) and starts to operate.

Sensor signals from a set of ordinary sensors 51, and control signals from an air-conditioning control panel 52 mounted in a dash board at the front of the passenger compartment, are input into the ECU 50. The sensors are of the type well known in the art, and include an outside temperature sensor 54, an inside temperature sensor 55, solar radiation sensors 56a, 56b for detecting the amount of solar radiation reaching the driver seat side (the right side) and the passenger seat side (the left side) in the passenger compartment, a post-evaporator temperature sensor 57 for detecting the temperature of air exiting the evaporator 13, and a water temperature sensor 58 for detecting the temperature of warm water entering the heater core 14.

On the air-conditioning control panel 52 there are provided a driver seat side (right side) temperature setter 59, a passenger seat side (left side) temperature setter 60, an air flow strength setter 61, a ventilation mode setter 62, an inside/outside air mode setter 63, an auto switch 64 for setting an automatic air-conditioning operation mode, and an air-conditioning switch 65 controlling operation of the compressor of the above-mentioned refrigerating cycle.

The various air-conditioning devices controlled by the ECU 50 are driven by a driving motor 66 of the inside/outside switching door 2a of the blower unit 1; a blower driving motor 67; driving motors 68a, 68b of the left and right first driving shafts 24, 24 for independently moving the left and right air-mixing film members 26, 26; driving motors 69a, 69b of the second driving shafts 34, 34 for independently moving the left and right ventilation mode switching film members 36, 36; driving motors 70a, 70b of the left and right cool air bypass doors 39, 39; and a driving motor 71 of the warm water valve 14a.

Figure 4:
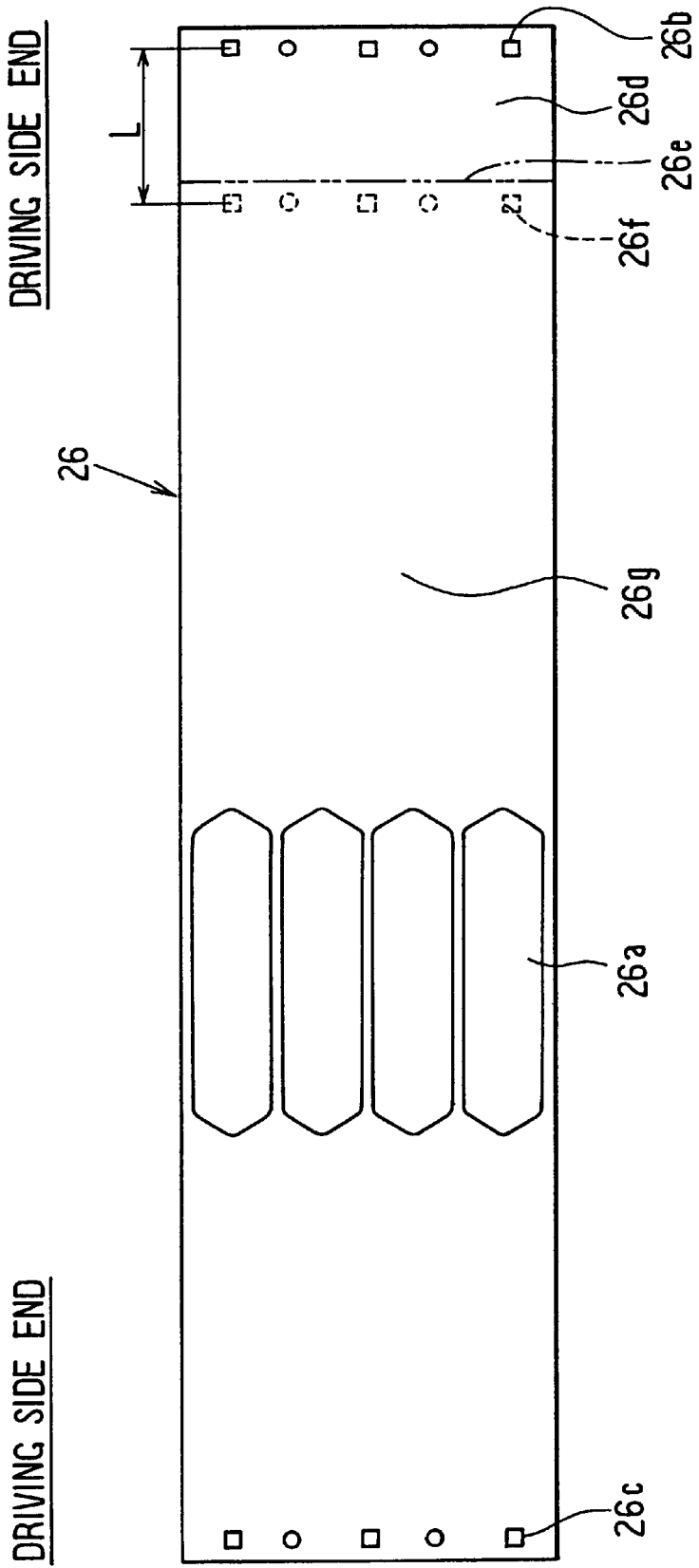
FIG. 4 is a plan view of an air-mixing film member of the first preferred embodiment.

FIG. 4 shows an example of the specific plan shape of driver seat side and passenger seat side air-mixing film members 26, 26. As shown in FIG. 4, openings 26a are provided for adjusting air flowing through the warm air passage 28 and the bypass passage 15. In this example, the openings 26a consist of four oblong hexagonal holes. Fixing holes 26b, 26c are provided in the driving side end and the following side end respectively of the air-mixing film member 26. The ends of the air-mixing film member 26 are fixed to the driving shaft 24 and the following shaft 25 by the fixing holes 26b, 26c.

An idle part 26d having a predetermined length L is provided at the driving side end of each of the air-mixing film members 26, 26. In FIG. 4, numerals 26e and 26f identify the driving side end and the mounting holes wherein the idle part 26d is not provided. The idle part 26d is provided so that it is possible for the position of the openings 26a to be displaced over the range of the predetermined length L at times of maximum cooling, with the film part 26g still completely closing the warm air passage 28 of the heater core 14.

The operation of this preferred embodiment will now be explained.

'FACE MODE'

The center face opening 32a connected to the face outlet ports 17, 20 is opened by an opening (not shown) in the ventilation mode switching film member 36. Further, as mentioned above, the side face openings 32a, 32b connected to the side face outlet ports 18 open directly onto the air-mixing chamber 31 without the ventilation mode switching film members 36 being therebetween. However, the defroster outlet port 16 and the foot opening 33 are both closed by the ventilation mode switching film member 36.

When the centrifugal blower 3 of the blower unit 1 is operated, air taken in through the inside/outside air switching box 2 is first cooled and dehumidified in the evaporator 13 and is cooled. The cooled air then branches into the bypass passage 15, thereby bypassing the heater core 14 and the warm air passage 28. The cooled air then passes through the heater core 14 according to the position of the openings 26a in the air-mixing film member 26.

However, at times of maximum cooling the openings 26a of the air-mixing film member 26 fully open the bypass passage 15, and the film part 26g fully closes the warm air passage 28. At the same time, the cool air bypass door 39 is operated to the position shown with solid lines in FIG. 1 to fully open the cool air bypass opening 38. Consequently, most of the cool air flows into the face openings 32a, 32b through the bypass passage 15 and the air-mixing chamber 31, while some of the cool air passes through the cool air bypass opening 38 and flows directly into the face openings 32a, 32b.

The cool air entering the center face opening 32a passes through the front seat center face outlet port 17 and the rear seat face outlet port 20 and then out through the front and rear seat face outlets. The cool air passing through the side face openings 32b passes through the side face outlet ports 18 and through the side face outlets. When the passenger compartment temperature is adjusted, the openings 26a of the air-mixing film member 26 are moved to a position such that the bypass passage 15 is still open, while the warm air passage 28 is only partially open at the same time. Consequently, warm air flows up through the warm air passage 30 into the air-mixing chamber 31. Here, the warm air mixes with the cool air having passed through the bypass passage 15 and is adjusted to a desired temperature. The temperature-adjusted cool air then passes through the face outlet ports 17, 20 and the side face outlet ports 18 and is blown into the passenger compartment.

'BI-LEVEL (BL) MODE'

The face openings 32a, 32b and the foot opening 33 are simultaneously opened by openings in the ventilation mode switching film member 36. However, the defroster outlet port 16 is closed by a film part of the ventilation mode switching film member 36. Consequently, conditioned air passes through the front seat center face outlet port 17, the front seat side face outlet ports 18 and the rear seat face outlet port 20 and is blown into the passenger compartment. At the same time, conditioned air is blown out through the front seat and rear seat foot outlet ports 19 and 21.

That is, warm and cool air are mixed in the air-mixing chamber 31 to obtain conditioned air of a required temperature, which is subsequently blown into the passenger compartment.

'FOOT MODE'

A small aperture is formed via the openings in the ventilation mode switching film member 36 at the defroster outlet port 16. Simultaneously, a large aperture is formed via the film member openings at the foot opening 33. At this time, the side face openings 32b connecting with the side face outlet ports 18 are also open. However, the center face opening 32a connecting with the face outlet ports 17, 20 is closed by the film member 36.

In a blowout air temperature control region, the flow proportions of cool air passing through the bypass passage 15 and warm air passing through the warm air passage 28 are adjusted by adjusting the position of the openings 26a in the air-mixing film member 26. Consequently, the warm air and the cool air are mixed in the air-mixing chamber 31 to create warm air having a desired temperature, some of which is blown out through the defroster outlet port 16 and the side face outlet ports 18. At the same time, the majority of the warm air passes through the foot opening 33 and is blown through the foot outlet ports 19, 21.

When a maximum heating state is set in the foot mode, the air-mixing film member 26 fully closes the bypass passage 15 and fully opens the warm air passage 28. Therefore, only warm air from the warm air passage 28 flows into the outlet ports 16, 18, 19, 21, and a maximum heating effect is obtained.

In the foot mode, the flow of conditioned air blown out through the defroster outlet port 16 and the side face outlet ports 18 is approximately 20% and the flow of conditioned air blown through the foot outlet ports 19, 21 is about 80%.

Here, a FOOT/DEFROSTER (F/D) MODE wherein the flow of conditioned air blown out through the defroster outlet port 16 and the side face outlet ports 18 is increased to about 50% and the flow of conditioned air blown out through the foot outlet ports 19, 21 is decreased to about 50% may be provided separately from the FOOT MODE.

'DEFROSTER (DEF) MODE'

The defroster outlet port 16 is fully opened via an opening in the ventilation mode switching film member 36. At this time also, the side face openings 32b connecting with the side face outlet ports 18 are open. However, the center face opening 32a connecting with the face outlet ports 17, 20 and the foot opening 33 are both closed by the ventilation mode switching film member 36. Therefore, warm air at a required temperature created by warm air and cool air mixing in the air-mixing chamber 31 is blown out only through the defroster outlet port 16 and the side face outlet ports 18.

The foregoing description is an outline of the operation of each ventilation mode. However, a partition plate 41 is centrally provided in the air-conditioning unit 10 as shown in FIG. 2, and partitions the ventilation path into a vehicle right side ventilation path 42 and a vehicle left side ventilation path 43. Also, a movable air-mixing film member 26 is independently provided for each of the left and right ventilation paths 42 and 43. Therefore, the temperature of air blown into the left side of the passenger compartment and the temperature of air blown into the right side of the passenger compartment can be independently controlled by controlling the operating positions of the air-mixing film members 26, 26.

Independent temperature control of air blown into the left and right sides of the passenger compartment executed by the ECU 50 will now be described on the basis of the flow diagram of FIG. 5. If the auto switch 64 (FIG. 3) is switched on and an automatic air-conditioning operation mode is thereby selected, automatic control processing of the air-conditioning system is started at step 100. At step 101, initialization of a control routine is carried out.

Subsequently, at step 102, temperature setting signals Tset(Dr) and Tset(Pa) from the driver seat side and passenger seat side temperature setters 59, 60, and signals Tam, Tr, TsDr, TsPa, Te and Tw from the outside temperature sensor 54, the inside temperature sensor 55, the solar radiation sensors 56a, 56b of the driver seat side and passenger seat side, the post-evaporator temperature sensor 57 and the water temperature sensor 58 are read.

At step 103, based on the following equations Exp. 1 and Exp. 2, a target outlet temperature TAO(Dr) and a target outlet temperature TAO(Pa) of air blown out to the driver seat side and to the passenger seat side of the passenger compartment respectively are calculated:

$$TAO(Dr)=Kset \times Tset(Dr)-Kr \times Tr-Kam \times Tam-Ks \times Ts(Dr)+C \quad \text{Exp. 1}$$

$$TAO(Pa)=Kset \times Tset(Pa)-Kr \times Tr-Kam \times Tam-Ks \times Ts(Pa)+C \quad \text{Exp. 2}$$

where Kset is a temperature setting gain, Kr is an inside temperature gain, Kam is an outside temperature gain, Ks is a solar radiation gain and C is a constant for correction.

At step 104, based on the following Exp. 3 and Exp. 4, target apertures SW(Dr) and SW(Pa) of the driver seat side and passenger seat side air-mixing film members 26, 26 are calculated.

$$SW(Dr)=\{(TAO(Dr)-Te)/(Tw-Te)\} \times 100 \ (\%) \quad \text{Exp. 3}$$

$$SW(Pa)=\{(TAO(Pa)-Te)/(Tw-Te)\} \times 100 \ (\%) \quad \text{Exp. 4}$$

Figure 6:
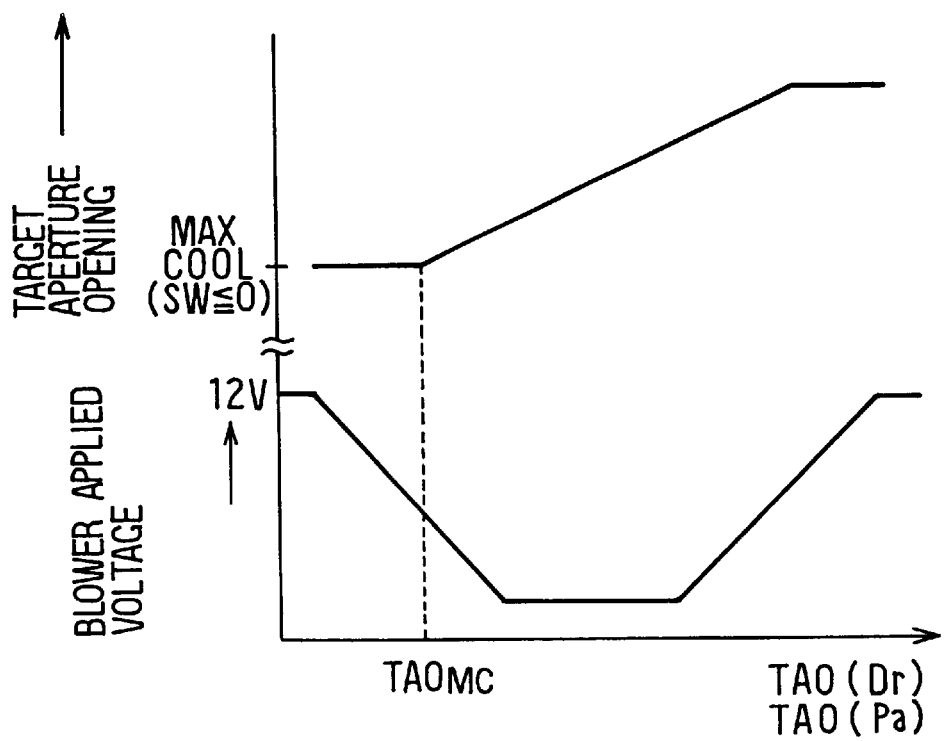
FIG. 6 is a characteristic diagram of electronic control in the first preferred embodiment.

At step 105, it is determined whether or not the TAO(Dr) and the TAO(Pa) calculated at step 103 are different and whether or not the SW(Dr) and the SW(Pa) calculated at step 104 are both less than or equal to 0 (this is the MAX) COOL, or maximum cooling state, of FIG. 6). In FIG. 6, the predetermined value $TAO_{MC}$ is the temperature at which the warm water valve 14a is fully closed and at which the circulation of warm water through the heater core 14 is thereby stopped. Also, the warm air passage 28 is fully closed by the film part 26g and thus the actual temperature of air blown out into the passenger compartment is a minimum temperature. In FIG. 6, the blower impressed voltage is the voltage impressed on the blower driving motor 67; the speed (delivery flow) of the centrifugal blower 3 increases in proportion with increasing of this blower impressed voltage.

When at step 105 it is determined that TAO(Dr) and TAO(Pa) are different (for example TAO(Dr)>TAO(Pa)) so that left-right independent temperature control must be carried out and that SW(Dr) and SW(Pa) are both 0 or below, processing proceeds to step 106 and determines a driver seat (Dr) side target blower voltage $E_{Dr}$ and a passenger seat (Pa) side target blower voltage $E_{Pa}$ from the map on the lower side of FIG. 6 based on the target outlet temperatures TAO(Dr), TAO(Pa).

Next, at step 107, it is determined which of the driver seat (Dr) side target blower voltage $E_{Dr}$ and the passenger seat (Pa) side target blower voltage $E_{Pa}$ is the greater. When the target blower voltage $E_{Dr}$ is greater than the target blower voltage $E_{pa}$, processing proceeds to step 108 and a final target blower voltage $E_o$ is set to $E_{Dr}$. When the target blower voltage $E_{Pa}$ is greater than the target blower voltage $E_{Dr}$, processing proceeds to step 109 and sets the final target blower voltage $E_o$ to $E_{Pa}$.

Figure 7:
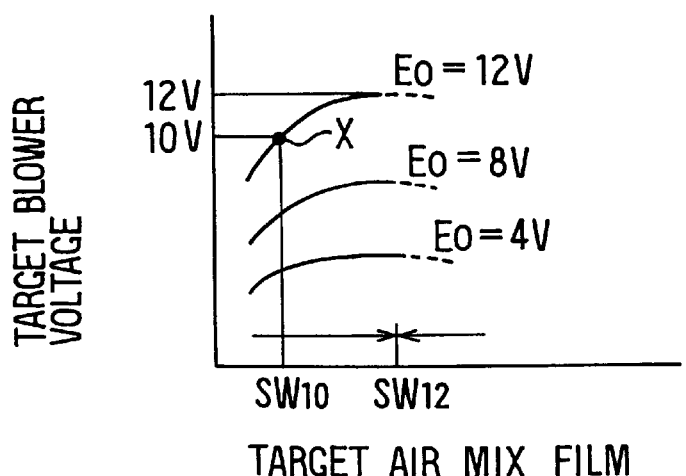
FIG. 7 is a characteristic diagram of electronic control in the first preferred embodiment.

At step 110, a target aperture (target operating position) of the air-mixing film member 26 on the side having a higher target outlet temperature, for example the target aperture $SW_{Dr}$ of the driver seat side air-mixing film member 26, is finally determined from the map shown in FIG. 7. For example, the vertical axis of FIG. 7 represents the target blower voltage (target air flow). If it is assumed that the final target blower voltage $E_o$ is 12V (the maximum voltage of the car battery), the flow is a maximum flow.

At this time, supposing that from the blower voltage map of FIG. 6 the target blower voltage on the side having the higher target outlet temperature (the driver seat side), the target blower voltage $E_{Dr}$, is a value lower by a certain amount than 12V, for example 10V, the target aperture $SW_{10}$ of the air-mixing film member 26 of the side having the higher target outlet temperature (the driver seat side) can be finally determined from the intersection X of the characteristic curve $E_o$=12V shown in FIG. 7 with the target blower voltage=10V line.

The target aperture of the air-mixing film member 26 on the horizontal axis of FIG. 7 shows the open area of the bypass passage 15 decreasing toward the left side of FIG. 7. Thus, the above-mentioned target aperture $SW_{10}$ of the driver seat side air-mixing film member 26 represents a reduced open area of the bypass passage 15 compared to the target aperture $SW_{12}$ of when $E_o$=12V, where $SW_{12}$ is the fully open position of the bypass passage 15.

For the passenger seat side target aperture (target operating position) $SW_{Pa}$, the value calculated at step 104 is unchanged, and thus the target apertures of the two air-mixing film members 26, 26 of the driver seat side and the passenger seat side are independently controlled in a state of maximum cooling. The technological significance of this will now be explained.

FIG. 8 shows the operating positions of the driver seat side and passenger seat side air-mixing film members 26, 26 during normal maximum cooling, when the driver seat side and passenger seat side target outlet temperatures TAO(Dr) and TAO(Pa) are the same. In this case, the openings 26a, 26a in the air-mixing film members 26, 26 fully open the bypass passages 15, 15 while the side warm air passages 28, 28 of the heater core 14 are fully closed, so that the left-right flow distribution is 50:50.

Next, referring to FIG. 9, TAO(Dr)>TAO(Pa) and the driver seat side air-mixing film member 26 is wound from the state shown in FIG. 8 to the following shaft 25 side so that its openings 26a reduce the open area of the bypass passage 15. At this time, because the idle part 26d is provided, the warm air passage 28 of the heater core 14 remains fully closed.

On the passenger seat side having the lower target outlet temperature TAO(Pa), because the openings 26a of the air-mixing film member 26 fully open the bypass passage 15 and, as described above, a target blower voltage $E_{Pa}$ corresponding to the target outlet temperature TAO(Pa) is set as the final target blower voltage $E_o$, the flow on the passenger seat side is increased and the cooling effect in the passenger seat side space is increased.

On the driver seat side, which has the higher target outlet temperature TAO(Dr), an increase in air flow is avoided and cool air is prevented from becoming excessive as the openings 26a reduce the open area of the bypass passage 15 as described above.

Therefore, for example, when solar radiation is incident on the passenger seat side only and does not reach the driver seat side at a time of maximum cooling, it is possible to increase air flow on the passenger seat side only and improve the cooling feeling while avoiding an increase in the cool air flow on the driver seat side and thereby prevent excessive cooling thereat. In FIG. 9, as an example, the left-right flow distribution is passenger seat side 80:driver seat side 20.

Figure 10:
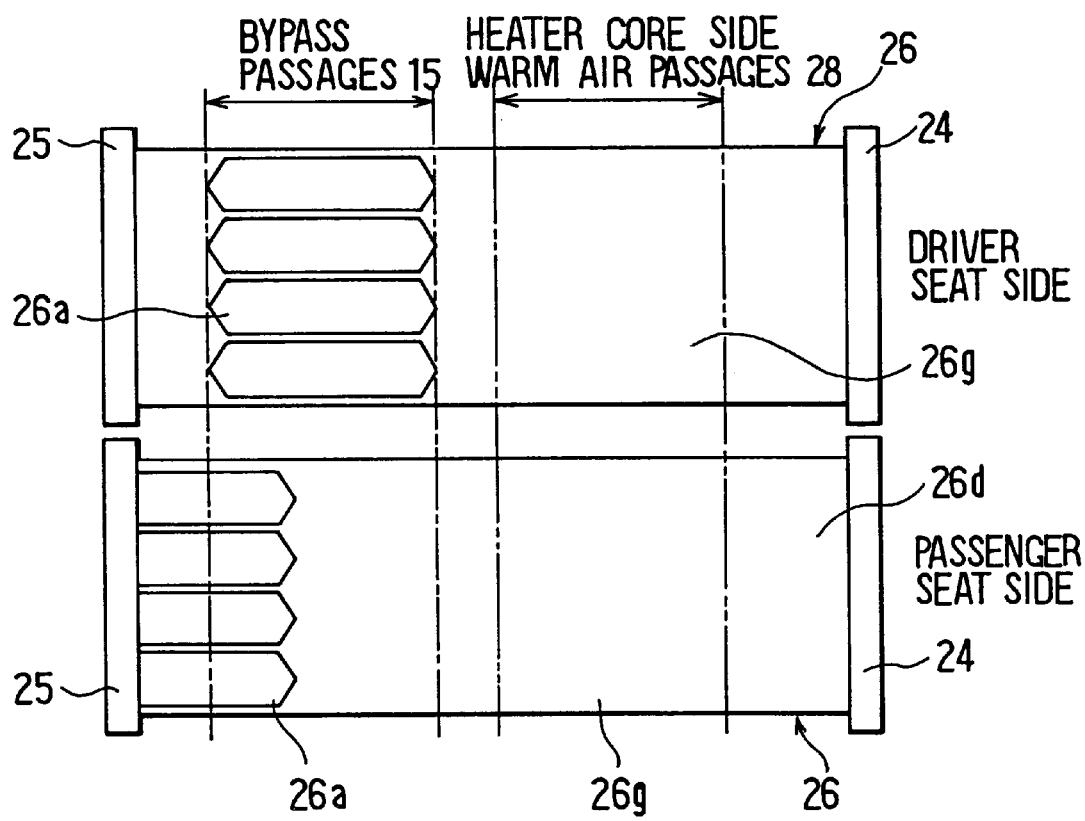
FIG. 10 is a plan view of left and right air-mixing film members of the first preferred embodiment.

FIG. 10 illustrates a state wherein solar radiation is incident on the driver seat side only and does not reach the passenger seat side at a time of maximum cooling. Here, the bypass passage 15 on the driver seat side is fully opened due to the position of the openings 26a of the driver seat side air-mixing film member 26. On the passenger seat side, the open area of the bypass passage 15 is reduced by the film part of the passenger seat side air-mixing film member 26. In FIG. 10, for example, the left-right air flow distribution is 20:80.

Figure 11:
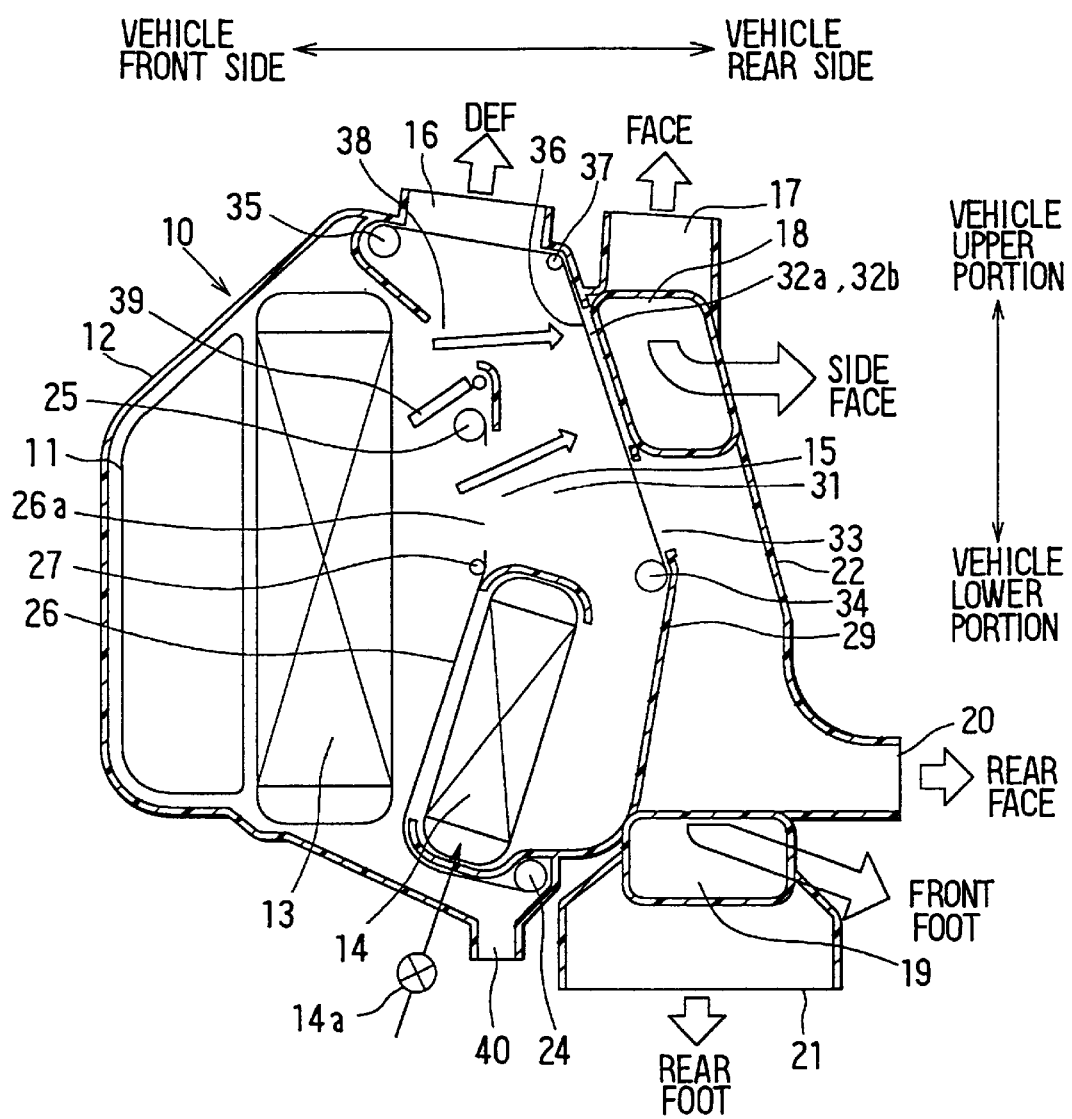
FIG. 11 is a schematic sectional side view illustrating the operation of the first preferred embodiment.
Figure 12:
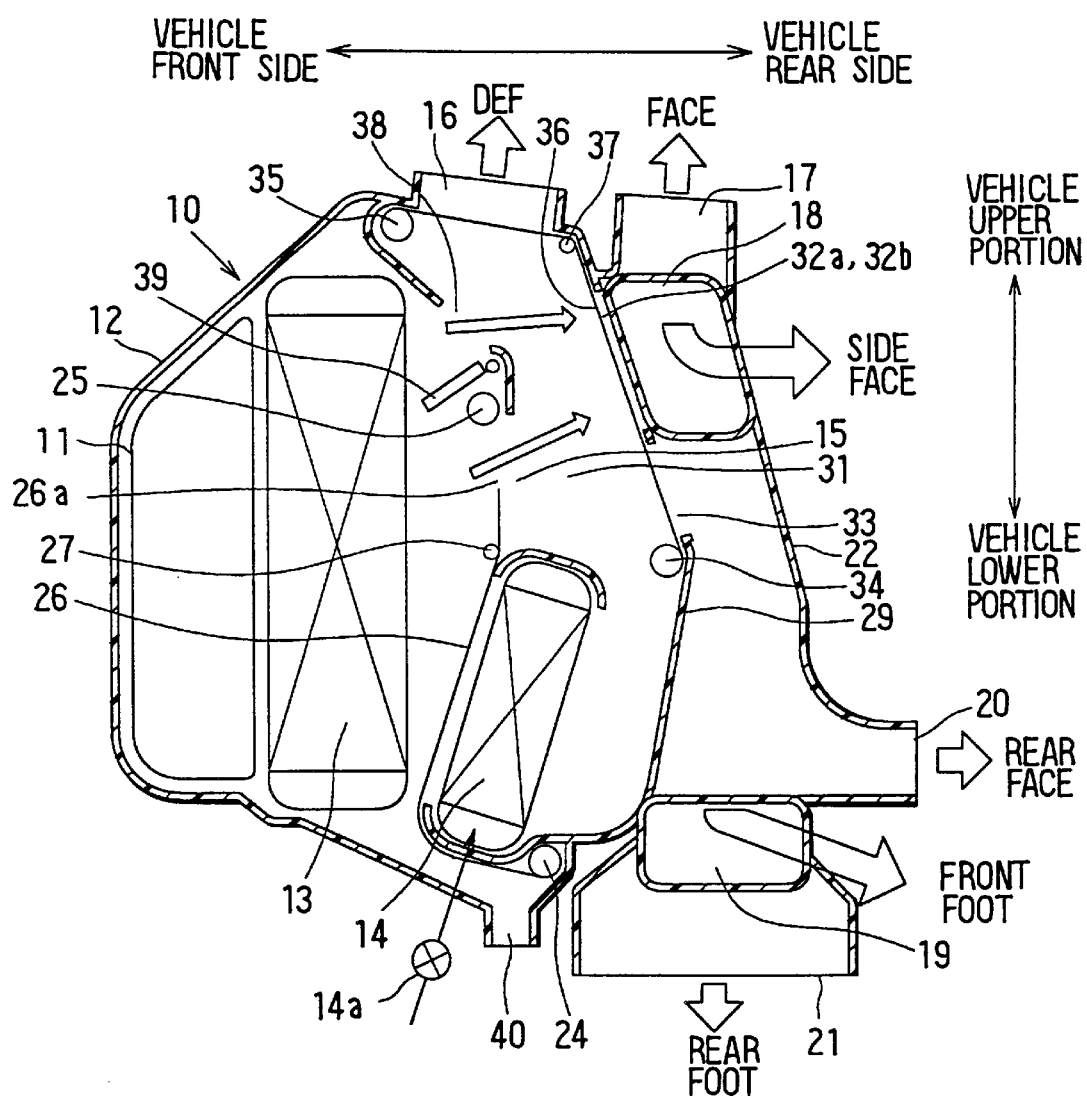
FIG. 12 is a schematic sectional side view illustrating the operation of the first preferred embodiment.

FIG. 11 shows the air-mixing film member 26 of the side in FIG. 9 or FIG. 10 on which the air-mixing film member 26 fully opens the bypass passage 15, and FIG. 12 shows the air-mixing film member 26 of the side in FIG. 9 or FIG. 10 on which the air-mixing film member 26 reduces the open area of the bypass passage 15.

Figure 5:
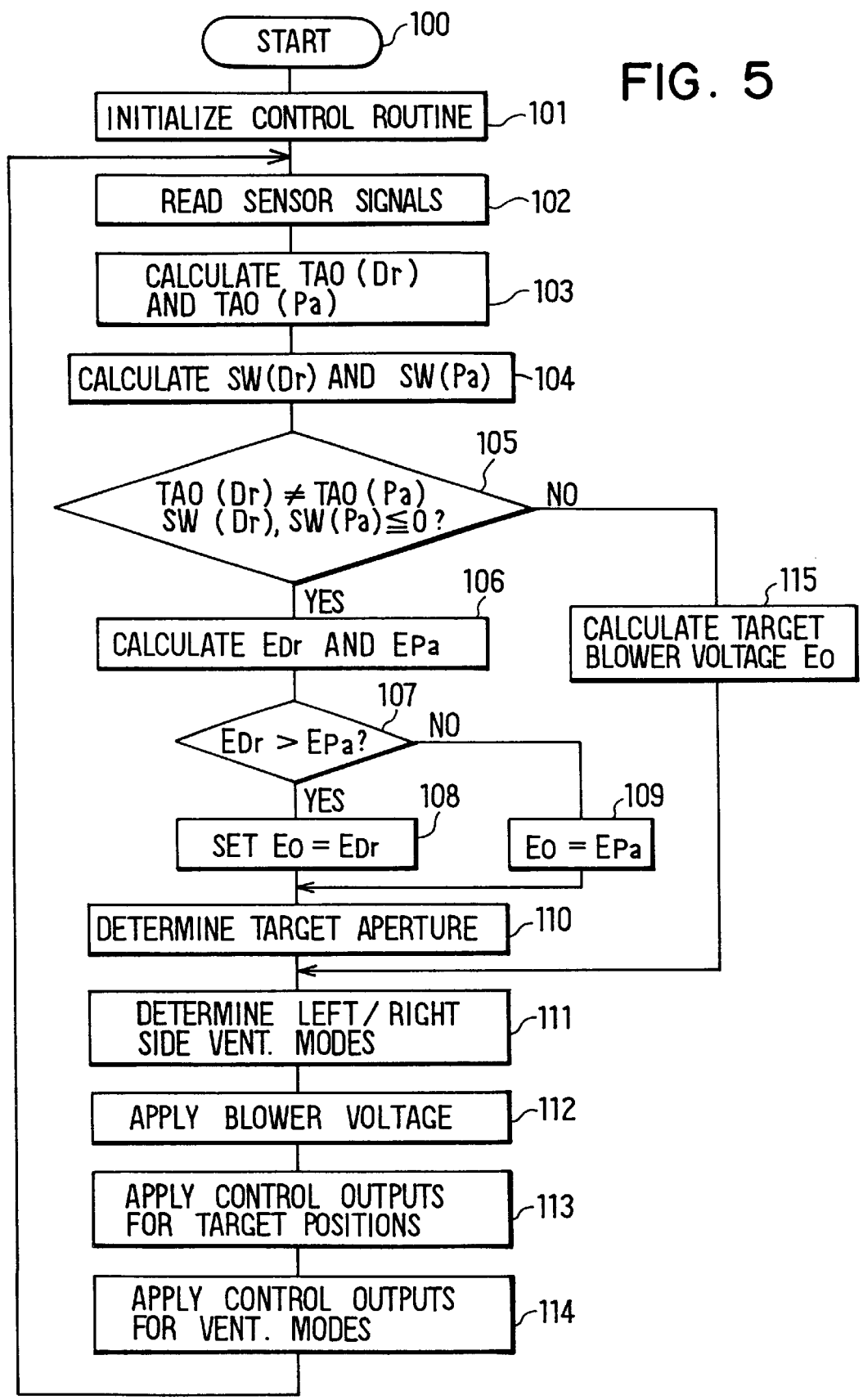
FIG. 5 is a flow diagram of electronic control in the first preferred embodiment.
Figure 13:
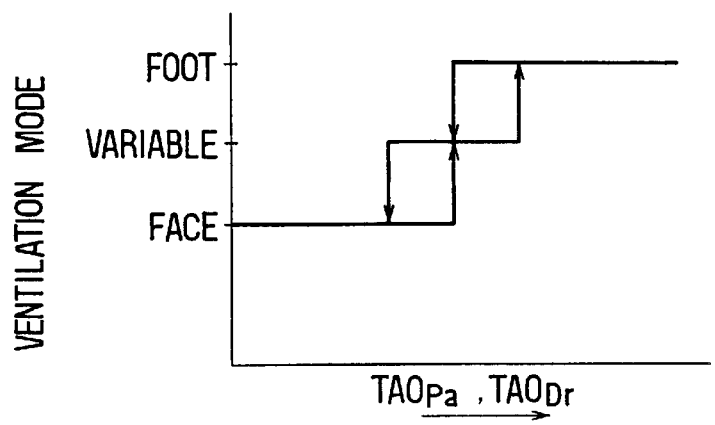
FIG. 13 is a characteristic diagram of electronic control in the first preferred embodiment.

Returning again to the flow diagram of FIG. 5, at step 111, left and right side ventilation modes are each determined from the map shown in FIG. 13 based on the above-mentioned TAO(Dr) and TAO(Pa). However, a defroster mode, wherein warm air is blown at the front windshield, is not determined using a TAO but rather is set using a defroster switch of the ventilation mode setter 62 mounted on the air-conditioning control panel.

At step 112, the above-mentioned final target blower voltage $E_o$ is applied to the blower driving motor 67 as a control output, and the blower driving motor 67 is thereby operated at a speed based on this voltage $E_o$.

At step 113, control outputs corresponding to the target positions (target apertures) SW calculated at steps 104, 110 are applied to the driving motors 68a, 68b of the left and right air-mixing film members 26, 26, and the two air-mixing film members 26, 26 are thereby driven to independent target aperture positions.

At step 114, control outputs corresponding to the ventilation modes determined at step 111 are applied to the driving motors 69a, 69b of the left and right ventilation mode switching film members 36, 36, and the two ventilation mode switching film members 36, 36 are thereby independently driven. However, when at step 105 TAO(Dr) and TAO(Pa) are both smaller than $TAO_{MC}$, the ventilation mode inevitably becomes the face mode.

When on the other hand at step 105 TAO(Dr) and TAO (Pa) are the same, or when SW(Dr) and SW(Pa) are greater than 0, processing proceeds to step 115 and calculates a target blower voltage $E_o$.

At step 115, based on the TAO(Dr) and TAO(Pa) calculated at step 103 and the map shown in FIG. 6, a driver seat side blower voltage $E_{Dr}$ and a passenger seat side blower voltage $E_{Pa}$ are calculated, and the average of the two blower voltages $E_{Dr}$ and $E_{Pa}$ is set as the target blower voltage $E_o$.

Subsequently, processing of the above-mentioned steps 111–114 is carried out and the various actuators are controlled to produce the respective target values.

As is clear from the foregoing description, the processing of step 115 and steps 111–114 is ordinary left-right independent control, while the processing of steps 105–110 is original control according to the invention for left-right independent flow distribution at times of maximum cooling.
(Second Preferred Embodiment)

Figure 14:
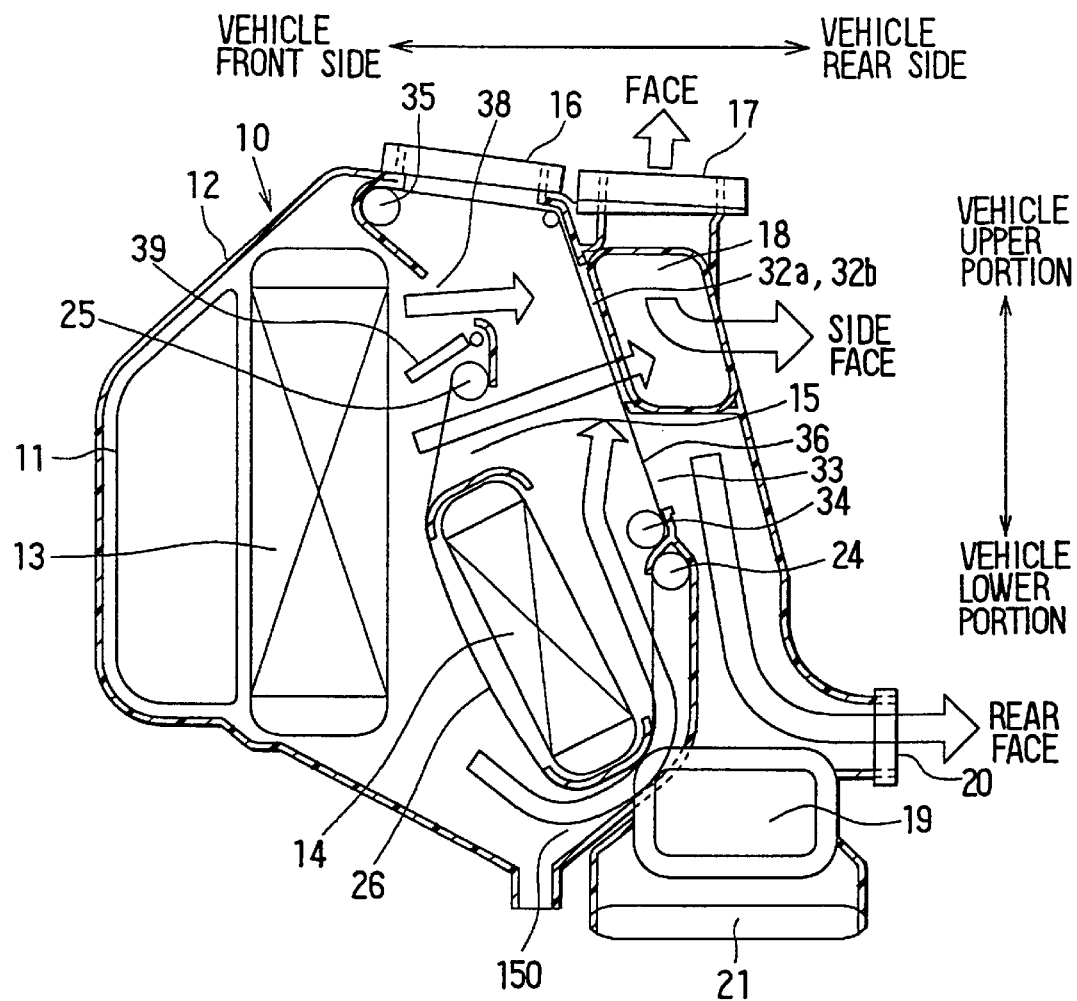
FIG. 14 is a schematic sectional side view of an air-conditioning unit in a second preferred embodiment.
Figure 15:
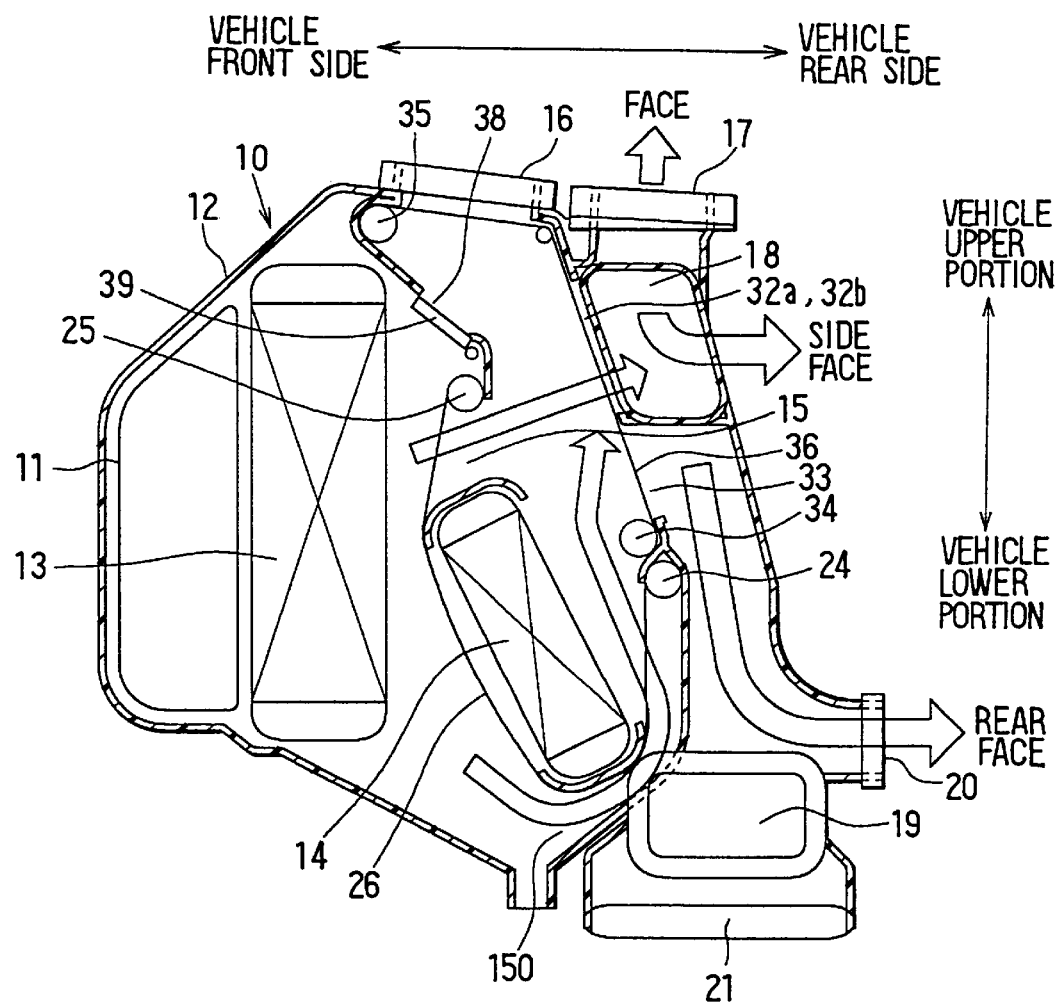
FIG. 15 is a schematic sectional side view of an air-conditioning unit in the second preferred embodiment.

FIG. 14 and FIG. 15 show a second preferred embodiment of the invention, wherein at times of maximum cooling the left and right air-mixing film members 26, 26 are operated to the positions shown in FIG. 8. In these positions, the members fully open the bypass passages 15, 15, and the blowout flow distribution of the left and right cool air flows is adjusted by the cool air bypass openings 38 being opened and closed via the cool air bypass doors 39.

FIG. 14 shows a normal maximum cooling state, wherein the cool air bypass opening 38 is fully opened by the cool air bypass door 39, and FIG. 15 shows a flow-controlled maximum cooling state, wherein the cool air bypass opening 38 is fully closed by the cool air bypass door 39.

In this second preferred embodiment, when a flow-controlled maximum cooling state is set, instead of the cool air bypass opening 38 being fully closed by its cool air bypass door 39, the open area of the cool air bypass opening 38 is reduced.

Also, in this second preferred embodiment, as well as the bypass passage 15 provided above the heater core 14, a further bypass passage 150 is provided below the heater core 14. Accordingly, an opening (not shown) for opening the bypass passage 150 is provided in each of the air-mixing film members 26, 26 in addition to the openings 26a, 26a for opening the bypass passages 15, 150 resulting in a three-layer flow passage wherein warm air that has passed through the heater core 14 is mixed with cool air from the bypass passages 15, 150 above and below the heater core 14.
(Third Preferred Embodiment)

Figure 16:
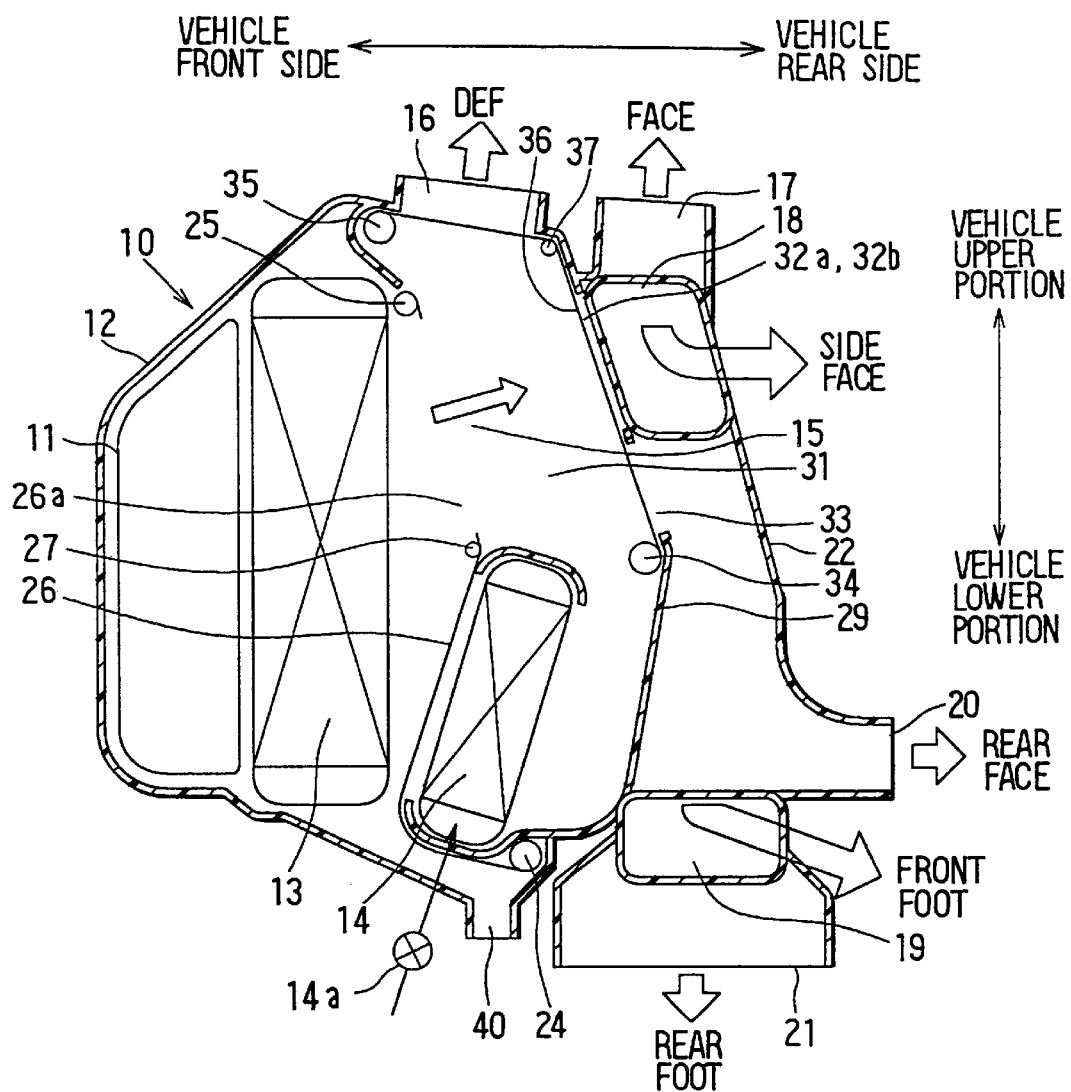
FIG. 16 is a schematic sectional side view of an air-conditioning unit in a third preferred embodiment.
Figure 17:
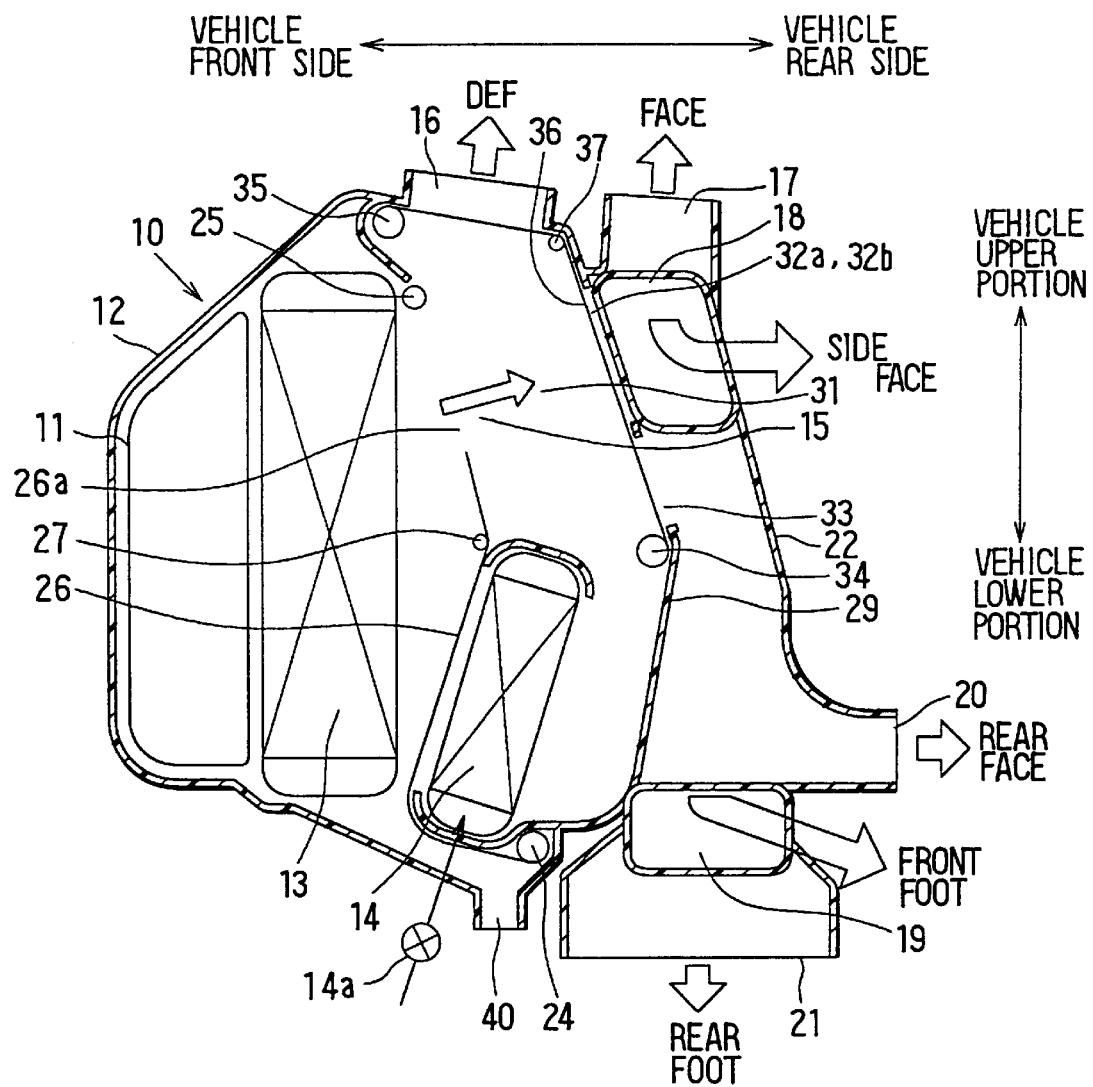
FIG. 17 is a schematic sectional side view of an air-conditioning unit in the third preferred embodiment.

FIG. 16 and FIG. 17 show a third preferred embodiment of the invention in which the cool air bypass openings 38 and the cool air bypass doors 39 in the first and second preferred embodiments are dispensed with. FIG. 16 shows a normal maximum cooling state, wherein the bypass passage 15 is fully opened by the openings 26a of the air-mixing film member 26. FIG. 17 shows a flow-controlled maximum cooling state, wherein the open area of the bypass passage 15 is reduced by the openings 26a of the air-mixing film member 26.
(Fourth Preferred Embodiment)

In the first through third preferred embodiments described above, in the maximum cooling state, the blowout flow distribution of left and right cool air flows is adjusted by control of the open areas of the bypass passages 15 with the air-mixing film members 26, or control of the open areas of the cool air bypass openings 38 with the cool air bypass doors 39 being carried out left-right independently. In a fourth preferred embodiment, the blowout flow distribution of left and right cool air flows is adjusted by control of the positions of the left and right ventilation mode switching film members 36, 36.

Figure 18:
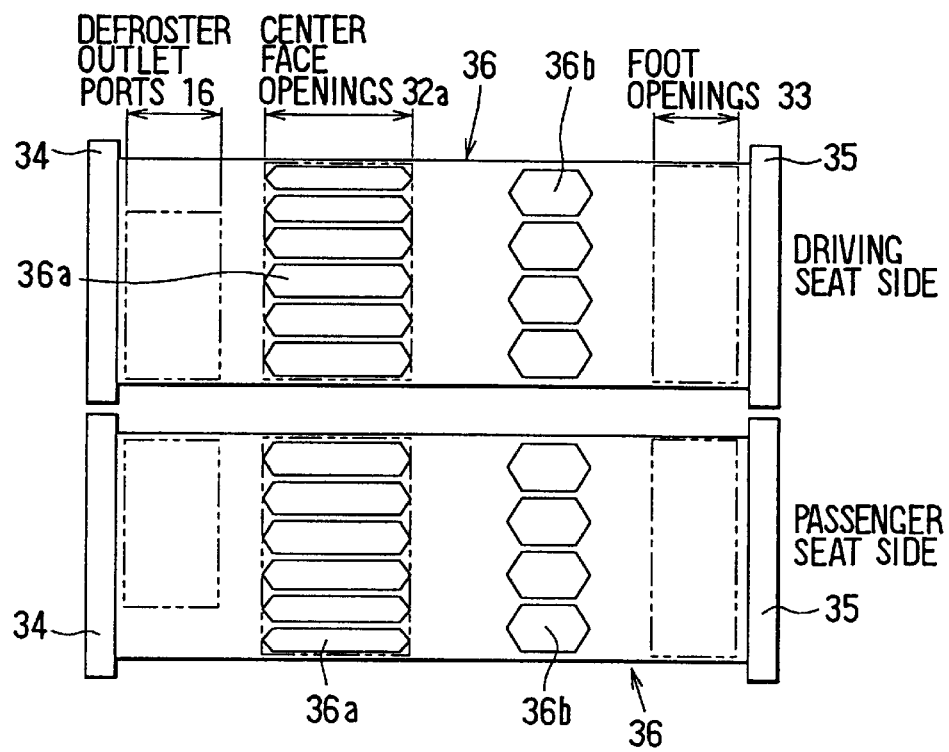
FIG. 18 is a plan view of left and right ventilation mode switching film members of a fourth preferred embodiment.
Figure 19:
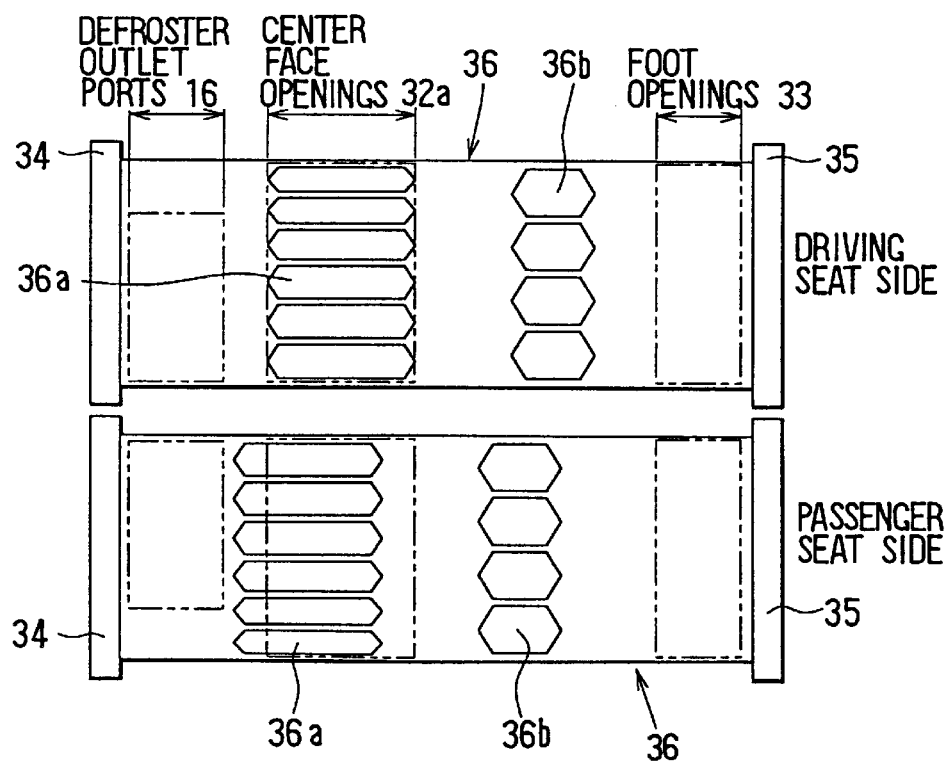
FIG. 19 is a plan view of left and right ventilation mode switching film members of the fourth preferred embodiment.

That is, in the fourth preferred embodiment illustrated in FIG. 18 and FIG. 19, openings 36a for adjusting the open areas of the defroster outlet ports 16 and the center face openings 32a, and openings 36b for adjusting the open areas of the foot openings 33 are provided in the left and right ventilation mode switching film members 36, 36.

FIG. 18 shows a state wherein the ventilation mode switching film members 36, 36 have been operated to a normal face mode position at a time of maximum cooling such that the left and right blowout flows are equal (50:50). In this case, the openings 36a, 36a in the left and right ventilation mode switching film members 36, 36 fully open the center face openings 32a, 32a.

FIG. 19 on the other hand shows as an example a state wherein the left-right cool air flow distribution at a time of maximum cooling has been set so that the flow on the driver seat Dr side is greater than the flow on the passenger seat Pa side. In this case, the openings 36a in the driver seat Dr side ventilation mode switching film member 36 fully open the respective center face opening 32a, while the openings 36a in the passenger seat Pa side ventilation mode switching film member 36 are operated to a position in which the open area of the respective center face opening 32a is reduced, thereby reducing the cool air blowout flow on the passenger seat Pa side.

Figure 20:
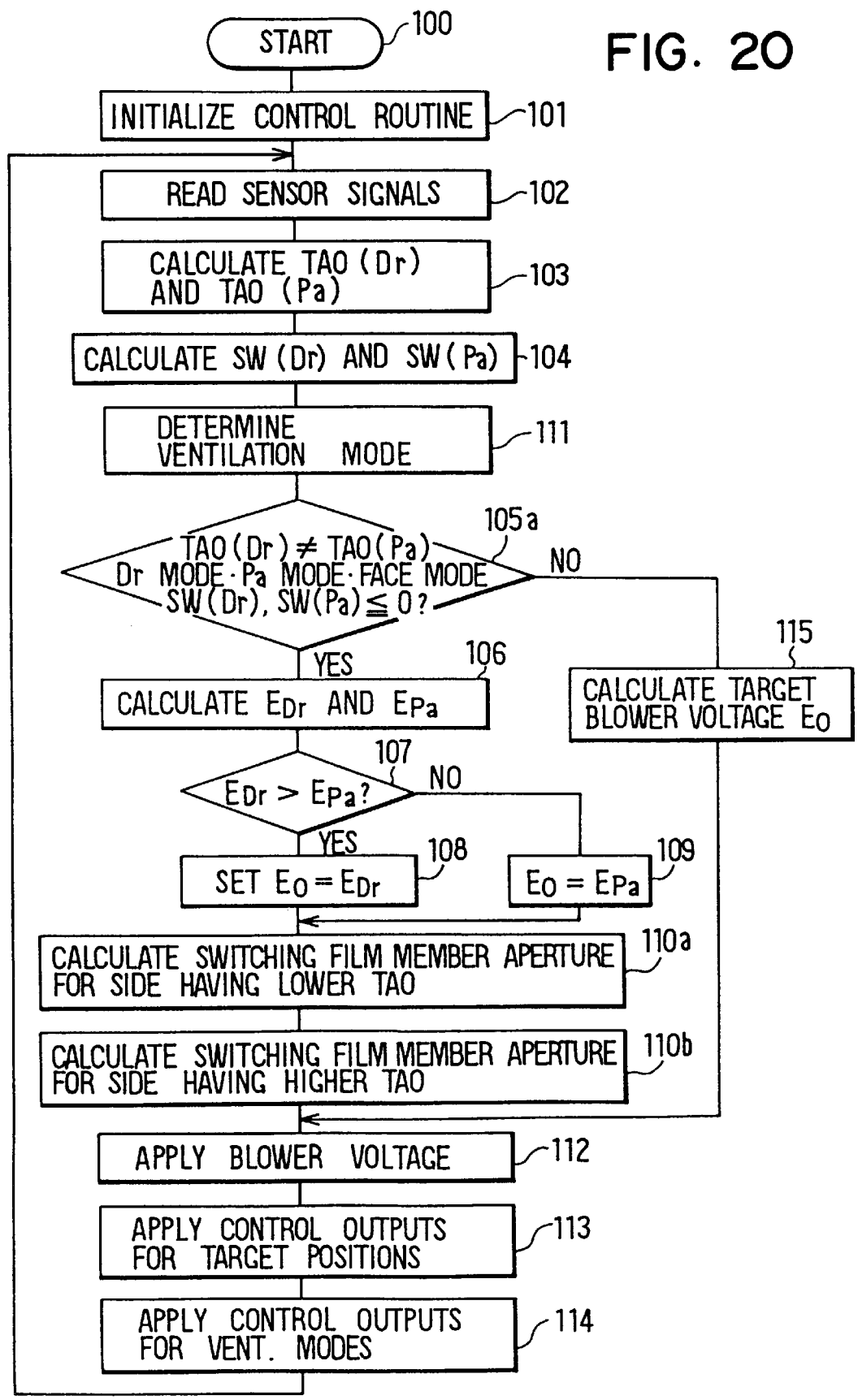
FIG. 20 is a flow diagram of electronic control in the fourth preferred embodiment.

FIG. 20 is a control flow diagram for the fourth preferred embodiment described above. Parts in FIG. 20 which are the same as or equivalent to parts in FIG. 5 have been given the same reference numerals. In FIG. 20, after step 104, at step 111 a ventilation mode is determined.

The next step 105a is a modified version of step 105 wherein the ventilation modes of the driver seat side and the passenger seat side both being the face mode is added as a condition of the determination. This is because in the fourth preferred embodiment the left-right air flow distribution is adjusted by controlling the open areas of the left and right center face openings 32a, 32a in the face mode through control of the operating positions of the ventilation mode switching film members 36, 36.

Steps 110a and 110b correspond to step 110 of FIG. 5. At step 110a, the aperture of the ventilation mode switching film member 36 of the side having the lower TAO is uniformly calculated as the aperture at which the openings 36a fully open the center face opening 32a. As a result, the cool air flow on the side having the lower TAO can be increased.

At step 110b, the aperture of the ventilation mode switching film member 36 of the side having the higher TAO is calculated using the same kind of map as that of the above-mentioned FIG. 7. In addition, the open area of the center face opening 32a on the side having the higher TAO is reduced by of the openings 36a of the ventilation mode switching film member 36 of that side to avoid cool air flow on the side having the higher TAO from becoming excessive.

(Other Preferred Embodiments)

In the preferred embodiments described above, cases wherein the side face openings 32b connecting with the side face outlet port 18 open directly onto the air-mixing chamber 31 without the ventilation mode switching film member 36 coming therebetween were described. However, the side face openings 32b may of course alternatively be made to open onto the air-mixing chamber 31 in a full ventilation mode by way of an opening provided in the ventilation mode switching film member 36.

By adding an opening to the ventilation mode switching film member 36 for opening the side face openings 32b in such a manner, in the fourth preferred embodiment described above, the open areas of the center face opening 32a and the side face openings 32b can both be reduced with the ventilation mode switching film member 36 on the side having the higher TAO to suppress the cool air blowout flows from both the center face outlet and the side face outlets. Thus it is possible using the ventilation mode switching film member 36 to still better prevent the flow of cool air on the side having the higher TAO from becoming excessive.

In the second preferred embodiment shown in FIG. 14 and FIG. 15, because the left-right air flow distribution during maximum cooling is controlled using the cool air bypass doors 39 and the cool air bypass openings 38, as air-mixing devices, instead of the air-mixing film members 26, plate-like air-mixing doors may alternatively be used.

Also, it is possible to use plate-like ventilation mode switching doors as the ventilation mode switching device in the first through third preferred embodiments, instead of the ventilation mode switching film members 36.

Although in all the above preferred embodiments the motor speed was varied by varying the voltage impressed on the blower driving motor 67 of the centrifugal blower 3, and the delivery air flow of the centrifugal blower 3 was varied thereby, alternatively it is of course possible to utilize pulse width modulation (PWM), wherein a pulse voltage is impressed on the blower driving motor 67 and the motor speed is varied by varying the pulse width of this pulse voltage, to adjust the delivery flow of the centrifugal blower 3.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A vehicle air-conditioning system comprising:
   an air-conditioning case defining a ventilation path;
   a cooling heat exchanger disposed in the air-conditioning case for cooling air;
   a heating heat exchanger, disposed in the air-conditioning case on a downstream side of the cooling heat exchanger, for heating air;
   a bypass passage for bypassing air around said heat exchanger;
   a partition plate for partitioning the ventilation path into a right side ventilation path and a left side ventilation path at least on a downstream side of the heating heat exchanger; and
   right and left side temperature adjusters, respectively disposed in the right side ventilation path and the left side ventilation path, for controllably adjusting an amount of conditioned air heated by the heating heat exchanger and fed to respective right and left passenger compartment sides, said right and left side temperature adjusters being mixing devices;
   a blower that blows air through said heat exchanger, said right side ventilation path and said left side ventilation path;
   wherein when said left and right side temperature adjusters are in a maximum cooling state and the heat load in one of said left and right passenger compartment sides has a higher heat load than the other of said left and right passenger compartment sides, an air-blow amount provided by said blower is increased and an opening of one of said left and right side temperature adjusters corresponding to a cooler of said left and right passenger compartment sides is reduced.

2. The vehicle air-conditioning system of claim 1, wherein the passenger compartment sides under increased heat load and not under increased heat load each correspond to one of a driver seat side and a passenger seat side.

3. The vehicle air-conditioning system of claim 1, wherein the ventilation path includes a warm air passage in communication with the heating heat exchanger, and the bypass passage bypassing the heating heat exchanger.

4. The vehicle air-conditioning system of claim 3, wherein the mixing devices are each for adjusting flow proportions of warm air passing through the warm air passage and cool air passing through the bypass passage.

5. The vehicle air-conditioning system of claim 4, wherein the ventilation path also includes a lower bypass passage for bypassing the heating heat exchanger, the lower bypass passage, the bypass passage, and the warm air passage defining a three-layer air flow ventilation path.

6. The vehicle air-conditioning system of claim 4, wherein the mixing device for adjusting flow proportions of cool air passing through the bypass passage defines a mixing opening for allowing the cool air to pass through the bypass passage.

7. The vehicle air-conditioning system of claim 6, wherein the mixing opening is closed when a flow-controlled maximum cooling state is set.

8. The vehicle air-conditioning system of claim 6, wherein the mixing opening is reduced when a flow-controlled maximum cooling state is set.

9. The vehicle air-conditioning system of claim 4, wherein the mixing devices are film members having openings for adjusting the flow proportions of the warm air and the cool air, a film part of the film member, in one of the right side ventilation path and the left side ventilation path corresponding to a side on which the heat load has risen, for closing the warm air passage of the heating heat exchanger, while the opening fully opens the bypass passage while the film members are in the maximum cooling state; and
- a film part of the film member on a side on which the heat load has not risen closes the warm air passage of the heating heat exchanger, and an open area between the opening of the corresponding film member and the bypass passage is reduced.

10. The vehicle air-conditioning system of claim 1, further comprising cool air bypass openings each for guiding cool air directly from the cooling heat exchanger to a section of the ventilation path downstream from the heating heat exchanger; and
- cool air bypass doors for opening and closing the cool air bypass openings, the cool air bypass openings and the cool air bypass doors being disposed in both the right side ventilation path and the left side ventilation path.

11. The vehicle air conditioning system of claim 10, wherein the cool air bypass door on the passenger compartment side under increased heat load fully opens the corresponding cool air bypass opening, and the cool air bypass door on the passenger compartment side not under increased heat load reduces the corresponding cool air bypass opening in the maximum cooling state.

12. The vehicle air-conditioning system of claim 1, further comprising face outlet ports for blowing air toward an upper passenger compartment area, foot outlet ports for blowing air toward a lower passenger compartment area, and ventilation mode switches for the face outlet ports for switching air flow between the right side ventilation path and the left side ventilation path.

13. The vehicle air-conditioning system of claim 12, wherein a flow path to the face outlet ports is reduced by the ventilation mode switches on the side under increased heat load when the temperature adjusting devices are in the maximum cooling state in a face mode.

14. The vehicle air-conditioning system of claim 12, wherein the ventilation mode switches comprise film members.

15. The vehicle air-conditioning system of claim 14, wherein the film members are adjustable to regulate independent air flow distribution in both the left and right side ventilation paths.

16. The vehicle air-conditioning system of claim 12, wherein the ventilation mode switches comprise plate members.

17. The vehicle air-conditioning system of claim 12, wherein the ventilation mode switches are ventilation mode switching film members having openings for switching flows of air to the face outlet ports and the foot outlet ports, and
- wherein a ventilation path to the face outlet ports is fully opened by the opening of the ventilation mode switching film member corresponding to the side under increased heat load, and an open area between the opening of the ventilation mode switching film member and the ventilation path to the face outlet ports is reduced on the side not under increased heat load, when the temperature adjusting devices are in the maximum cooling state in a face mode.

18. The vehicle air-conditioning system of claim 1, wherein the heat load is determined based on an amount of solar radiation incident on the right and left passenger compartment sides.

19. A vehicle air-conditioning system comprising:
- an air-conditioner case including separate left and right side ventilation paths;
- a heating heat exchanger for providing heating air into said left and right side ventilation paths;
- a cooling heat exchanger for providing cooling air into said left and right side ventilation paths;
- a bypass passage for bypassing the heating heat exchanger;
- right and left side temperature adjusters, respectively disposed in the right and left side ventilation paths for adjusting flow proportions of cooled and heated air flowing through the ventilation paths and into respective right and left passenger compartment sides;
- a blower that feeds air through said right and left side ventilation paths; and
- wherein when the left and right side temperature adjusters are in a maximum cooling state and the heat load in one of said left and right passenger compartment sides has a higher heat load than the other of said left and right passenger compartment sides, an air-blow amount provided by said blower is increased and an opening of one of said left and right side temperature adjusters corresponding to a cooler of said left and right passenger compartment sides is reduced.

20. The vehicle air conditioning system of claim 19, wherein the controller controls one of the temperature adjusters so that a quantity of the heated air in a ventilation path corresponding to the increased heat load at one of the right and left sides of the passenger compartment is zero.

21. The vehicle air conditioning system of claim 19, wherein the cooling heat exchanger is disposed in the left and right ventilation paths, and the heating heat exchanger is disposed in the left and right ventilation paths downstream for the cooling heat exchanger;
- wherein each of the left and right side ventilation paths includes a left and front side bypass passage, respectively, that enables the cooled air cooled by the cooling heat exchanger to bypass the heating heat exchanger.

22. The vehicle air conditioning system of claim 19, wherein the bypass passage comprises an upper bypass passage located above the heating heat exchanger, and further comprising a lower bypass passage located below the heating heat exchanger.

23. The vehicle air conditioning system of claim 19, further comprising a temperature adjuster for adjusting an amount of the cooled air flowing through the bypass passage.

24. The vehicle air conditioning system of claim 19, wherein the right and left temperature adjusters comprise film members having openings that are selectively communicated with the right and left side ventilation paths for adjusting a mixture of the cooled and heated air flowing through the ventilation paths.

25. The vehicle air conditioning system of claim 24, wherein the film member openings are air-mixing openings that are closed during the maximum cooling state.

26. The vehicle air conditioning system of claim 24, wherein the film member openings are air-mixing openings that are reduced in size during the maximum cooling state.

27. The vehicle air conditioning system of claim 24, wherein a controller controls a location of the film members so that the heated air flow is zero during a maximum cooling state to thereby increase cooling only at one of the right and left passenger compartment sides in response to an increased heat load thereat.

* * * * *